(12) United States Patent
Nitz (10) Patent No.: US 11,549,855 B2
(45) Date of Patent: Jan. 10, 2023

(54) MEASURING MECHANICAL CHANGES

(71) Applicant: KUKA Deutschland GmbH, Augsburg (DE)

(72) Inventor: Gernot Nitz, Gersthofen (DE)

(73) Assignee: KUKA Deutschland GmbH, Augsburg (DE)

( * ) Notice: Subject to any disclaimer, the term of this patent is extended or adjusted under 35 U.S.C. 154(b) by 263 days.

(21) Appl. No.: 16/978,453

(22) PCT Filed: Feb. 27, 2019

(86) PCT No.: PCT/EP2019/054799
§ 371 (c)(1),
(2) Date: Sep. 4, 2020

(87) PCT Pub. No.: WO2019/170483
PCT Pub. Date: Sep. 12, 2019

(65) Prior Publication Data
US 2021/0372870 A1    Dec. 2, 2021

(30) Foreign Application Priority Data

Mar. 5, 2018    (DE) .................... 10 2018 203 251.3

(51) Int. Cl.
*G01L 3/00*    (2006.01)
*G01L 3/10*    (2006.01)
*G01L 1/22*    (2006.01)

(52) U.S. Cl.
CPC .............. *G01L 3/108* (2013.01); *G01L 1/225* (2013.01)

(58) Field of Classification Search
CPC ................................ G01L 3/108; G01L 1/225
See application file for complete search history.

(56) References Cited

U.S. PATENT DOCUMENTS

| 3,640,130 | A |   | 2/1972  | Spescha  |           |
|-----------|---|---|---------|----------|-----------|
| 3,956,927 | A | * | 5/1976  | Pearson  | G01L 9/0054 |
|           |   |   |         |          | 73/726 |
| 5,077,635 | A | * | 12/1991 | Bollhagen | G01D 5/2412 |
|           |   |   |         |          | 361/287 |

(Continued)

FOREIGN PATENT DOCUMENTS

| CN | 203550968 U | 4/2014 |
| DE |   1952522 A | 11/1970 |

(Continued)

OTHER PUBLICATIONS

German Patent Office; Search Report in related German Patent Application No. 10 2018 203 251.3 dated Aug. 13, 2018; 7 pages.

(Continued)

*Primary Examiner* — Max H Noori
(74) *Attorney, Agent, or Firm* — Dorton & Willis, LLP (57) ABSTRACT

A device for measuring mechanical changes includes at least one first resistor which is designed to convert a mechanical change into a change of its resistance value and at least one operational amplifier, wherein the at least first resistor and the operational amplifier are connected such that the at least first resistor serves as input resistance for the operational amplifier and the operational amplifier provides or can provide a measurement result at an output. The first resistor is for example a strain gauge that can be secured to a component.

17 Claims, 5 Drawing Sheets

(56) References Cited

U.S. PATENT DOCUMENTS

| | | |
|---|---|---|
| 7,049,830 B1 | 5/2006 | Thinnes |
| 10,712,400 B2 | 7/2020 | Motz et al. |
| 2003/0033886 A1* | 2/2003 | Davie .................... F16K 41/02 |
| | | 73/780 |
| 2007/0193361 A1* | 8/2007 | Coffey .................... G01L 5/243 |
| | | 73/780 |
| 2007/0255424 A1 | 11/2007 | Leydet |
| 2008/0317087 A1* | 12/2008 | Kimura ................. G01K 15/00 |
| | | 374/E7.004 |
| 2014/0159734 A1* | 6/2014 | Knill ................. G01R 19/0092 |
| | | 324/426 |
| 2015/0061407 A1* | 3/2015 | Sen ................. H03K 19/00369 |
| | | 307/113 |
| 2016/0274152 A1* | 9/2016 | Seki ....................... G01R 19/25 |
| 2018/0372779 A1* | 12/2018 | Peschke ................. G01R 13/22 |

FOREIGN PATENT DOCUMENTS

| | | |
|---|---|---|
| DE | 236994 A1 | 6/1986 |
| DE | 3538766 A1 | 5/1987 |
| DE | 102013204924 A1 | 9/2014 |
| EP | 2002230 A2 | 12/2008 |
| WO | 2016193307 A1 | 12/2016 |

OTHER PUBLICATIONS

Chinese Patent Office; Office Action in related Chinese Patent Application No. 201980017116.7 dated Dec. 3, 2021; 8 pages.

European Patent Office; Search Report in related International Patent Application No. PCT/EP2019/054799 dated May 7, 2019; 2 pages.

\* cited by examiner

MEASURING MECHANICAL CHANGES

CROSS-REFERENCE TO RELATED APPLICATIONS

This application is a national phase application under 35 U.S.C. § 371 of International Patent Application No. PCT/EP2019/054799, filed Feb. 27, 2019 (pending), which claims the benefit of priority to German Patent Application No. DE 10 2018 203 251.3, filed Mar. 5, 2018, the disclosures of which are incorporated by reference herein in their entirety.

TECHNICAL FIELD

The present invention relates to measuring mechanical changes. To this end, the invention provides a device, an arrangement, a use and a method.

BACKGROUND

It is already known from prior art to use strain gages (German acronym: DMS) for measuring mechanical changes of a component, for example. It is known from prior art to use strain gauges in a Wheatstone bridge circuit in a connected manner. For example, in a full bridge one would use two opposing strain gauges each, whose resistance changes (due to mechanical changes) enter into the measurement result with a positive sign, and two opposing strain gauges each, whose resistance changes enter into the measurement result with a negative sign.

The inventor of the present invention recognized that such circuits are of limited use for various applications.

SUMMARY

The object of the present invention is to improve the measuring of mechanical changes and/or to make it more flexible. This object is achieved by a device, an arrangement, and a method as described herein. Developments, which are explicitly described only for the device for example, also apply correspondingly for the arrangement, the use and the method.

According to one embodiment, a device for measuring mechanical changes is provided, comprising:

at least one resistor, which is designed to convert a mechanical change into a change of its resistance value; and at least one operational amplifier, wherein the at least one resistor and the operational amplifier are connected in such a manner that the at least one resistor serves as input resistance for the operational amplifier, and the operational amplifier provides or can provide a measurement result at an output.

Even though an operational amplifier is often also used when utilizing already known Wheatstone bridge circuits for measuring mechanical changes, the resistor, which converts a mechanical change into a change in its resistance value in such already known circuits, does not serve as input resistance for the operational amplifier. Instead, in such circuits, the inputs of the operational amplifier are connected to the so-called measuring diagonal.

By means of the embodiment proposed above, a large number of circuit possibilities can be achieved, which would not have been possible with a conventional bridge circuit. These are explained in greater detail in the text below.

In one embodiment, the first resistor is a strain gauge. As a person skilled in the art knows, strain gauges change their ohmic resistance when they are stretched, for example the mechanical change experienced by a component to which said gauges are attached. However, alternatively, the first resistor can also be an inductive resistor or a capacitive resistor. While embodiments of the present disclosure are primarily explained hereinafter using a strain gauge, the invention is not limited to the use of strain gauges.

According to one embodiment, the first resistor is attached or attachable to a component in such a manner that a mechanical change of the component effects or can effect the change in the resistance value of the at least first resistor.

In particular, when using a strain gauge, the strain gauge would be attached to the surface of the component in such a manner that the length of the strain gauge changes given a mechanical change of the component.

In one embodiment, the mechanical change of the component comprises a change of a measurement in at least one dimension and/or a bending and/or a torsion of the component. A change of a measurement in at least one dimension in this case refers in particular for example to a change in the length of the component (for example a rod), to which the first resistor is attached. The latter is thereby stretched. Also in the case of bending or torsion (again, of a rod for example), a stretching of the first resistor can result depending on the attachment of the first resistor to the component.

Particularly in the case of torsion, preferably torsion about one axis is involved. To detect such torsion, the first resistor can be attached to the component in a certain manner: at least one section of the first resistor reacts by means of a change of the resistance value to a mechanical change of this section in a first direction (e.g., strain direction). The first resistor is then preferably attached to the component in such a manner that this first direction forms an angle x with a parallel to the torsion axis, wherein: 0<x<90 degrees, preferably 10 degrees≤x, more preferably 30 degrees≤x, more preferably 40 degrees≤x and/or preferably x≤80 degrees, more preferably x≤60 degrees, more preferably x≤50 degrees.

In one embodiment, a first electrical connection of the first resistor (or when using multiple resistors, a first electrical connection of the resistors in each case) is coupled to an input of the operational amplifier. A second electrical connection of the first resistor (or resistors) is provided to be electrically coupled (in each case) to an electrical input voltage. By applying a suitable input voltage/suitable input voltages, the/every resistor can be individually "energized" or "de-energized." In addition, the various resistors can be weighted differently by means of suitable input voltages.

In one embodiment, the device is designed to measure various mechanical changes, in particular various types of mechanical changes, in the component by a change in the respective input voltage for the at least first resistor.

In this way—particularly when using multiple resistors—various mechanical changes of the components can be measured, for example bending not only about one axis but about various axes, or a change in length not only in one dimension but in multiple dimensions, or torsion not only about one axis/in one direction but about multiple axes and/or in multiple directions. Similarly, one can measure various types of mechanical changes of the component, in other words not only individually, for example, a change in length or bending or torsion, but one can also measure several of these types of mechanical changes.

In one embodiment, the input voltage for the at least first resistor can be fed back to infer the voltage actually applied to the at least first resistor from the value of the applied input voltage and the value of the feedback voltage. In this way, more exact measurements can be made possible. This will then make itself noticeable particularly when relatively long cables (e.g., having lengths of several meters, several tens of meters or more than 100 meters) are used for connecting the first resistor to its input voltage.

According to one embodiment, the device comprises a DA converter for providing the respective input voltage for the at least first resistor. This allows one to select the input voltage in a particularly user-friendly manner for any resistor.

According to one embodiment, the device comprises a shunt resistor, which is connected or can be connected in parallel to the at least first resistor. This can be used for calibrating the circuit.

According to one embodiment, the device comprises at least 2, preferably at least 3, more preferably at least 4, more preferably at least 8, 12 or 16 resistors, wherein the resistors are connected to each other in parallel and serve as input resistances for the operational amplifier. In principle, it is possible to use any number of resistors as input resistances for the operational amplifier.

By using multiple resistors, various mechanical changes can be measured (almost) simultaneously.

In one embodiment, the device is designed to be operated in a measurement mode, wherein in the measurement mode, two of the resistors in each case have input voltages applied in a pair-wise manner, said input voltages being essentially identical in terms of magnitude, but of opposite polarity.

Some interferences, such as temperature changes, can hereby be largely eliminated.

In one embodiment, the device is designed to be operated in a first test mode, wherein in the first test mode, an input voltage different from ground is applied to only one of the resistors, and the input voltage at all other resistors is connected to ground.

One can hereby test whether this one resistor is available/operational. Such a test can be performed sequentially for all resistors.

In one embodiment, the device comprises an additional test resistor, which is connected or can be connected in parallel to the at least first resistor, wherein the device is designed to be operated in a second test mode, wherein in the second test mode, an input voltage different from ground is applied only to the test resistor and the input voltage on all other resistors is connected to ground, and wherein in measurement mode, the input voltage for the test resistor is connected to ground.

In this second test mode, the operability of the operational amplifier can be verified, for example. In the normal measuring mode, the test resistor would not have any significant influence on the measurement result because applying ground as the input voltage for the test resistor "de-energizes" said test resistor.

In one embodiment, the device comprises at least two resistors and, in a first (amplification) stage, two operational amplifiers, wherein in each case at least one of the at least two resistors serves as input resistance for the two operational amplifiers, and wherein the outputs of the two operational amplifiers of the first stage are electrically coupled in each case to inputs of a third operational amplifier, wherein the third operational amplifier represents a second (amplification) stage, and delivers or can deliver a measurement result to an output.

Some interferences, such as common mode voltages at the inputs (e.g., network humming), can hereby be suppressed.

According to one aspect of the present invention, an arrangement for measuring mechanical changes is provided having:
a component; and
one of the devices described above, wherein the at least one resistor is attached preferably adhesively bonded, to the component.

To achieve a reliable mechanical bond between the component and the resistor, the resistor is preferably attached, for example adhesively bonded, in a planar manner to a surface of the component. In this way, the forces, which are created when there is a mechanical change of the component and transmitted to the resistor, are distributed to the entire contact surface between the component and the resistor.

In one application, the component comprises a 6D force-torque sensor having multiple measuring spokes, wherein each measuring spoke is equipped with multiple resistors of the measuring device.

In another embodiment, the component comprises a flex spline of a harmonic drive gear.

According to an additional aspect, the invention relates to the use of a resistor, which is designed to convert a mechanical change into a change of its resistance value, as input resistance for an operational amplifier.

According to an additional aspect, the invention relates to a method for measuring mechanical changes which comprises:
Providing one of the arrangements described above;
Supplying the at least first resistor with an input voltage; and
Outputting a measurement result at the output of the operational amplifier.

Additional advantages and features are found in the embodiments described herein.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
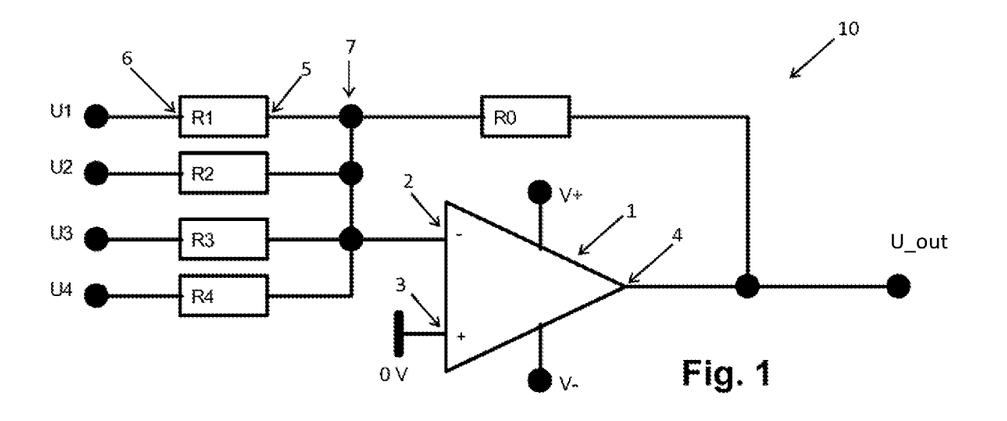
FIG. 1 illustrates an exemplary circuit according to an embodiment of the present disclosure.

FIG. 1 depicts a circuit according to an embodiment of the present disclosure. The measurement circuit 10 comprises a bipolar-fed operational amplifier 1 having an inverting input 2, a non-inverting input 3 and an output 4. The non-inverting input 3 is connected to ground (0V). A node 7 of the circuit 10 is (directly) coupled to the inverting input 2. The output voltage U_out can be picked off at the output 4. A resistor R0 is electrically coupled (directly) to the output 4 and the node 7. Also coupled to the node 7 is at least one input resistor—in the depicted example four input resistors R1, R2, R3 and R4. For the first input resistor R1, a first electrical connection 5 is indicated, which from an electrical perspective is (directly) coupled to the node 7. The input resistors are each directly connected electrically to an input voltage U1, U2, U3 and U4. For the first input resistor R1, a second electrical connection 6 is indicated, which from an electrical perspective is (directly) coupled to the input voltage U1. Additional input resistances could be correspondingly connected in parallel to the depicted resistors R1 to R4.

The circuit of FIG. 1 having only one operational amplifier 1 can be considered a single-stage amplification circuit. The value of the negative feedback resistor R0 in relation to the input resistors R1 to R4 determines the amplification.

It holds that: $U\_out = -U1(R0/R1) - U2(R0/R2) - U3(R0/R3) - U4(R0/R4)$

Thus, the circuit adds up the ratio of R0 to Ri (i=1, 2 . . . ), respectively weighted by the corresponding input voltage.

In this embodiment of the invention, the resistors R1 to R4 are not fixed resistors, but strain gauges. In this way, the circuit can be used to record mechanical changes that cause resistance changes in the strain gauge because a change of the resistance value of the resistors R1 to R4 has an effect on the output voltage U_out.

The input voltages may be provided by a DA converter, for example.

In tests conducted by the inventor, good results were achieved when strain gauges were selected for the resistors R1 to R4, whose resistance values are approximately equal, e.g., 350 ohms. However, having said that, one can also mix different strain gauges. By means of the magnitude and the sign of the input voltages U1 to U4, one can thereby individually control the weighting and the sign of the change of the resistors R1 to R4.

By adding strain gauges, one can arbitrarily increase the effect of the resistance change in the used strain gauges on the output signal. Given a Wheatstone bridge, this is not possible beyond the four essentially available bridge resistors. For example, in a Wheatstone bridge, if two strain gauges are connected in series per bridge arm, one has doubled the resistance change in a bridge arm given the same elongation of the two strain gauges; however, since the overall resistance has also doubled, the same influence results on the output voltage of the bridge as with individual strain gauges in the bridge arm. A parallel circuit of strain gauges in a bridge arm yields similar conditions.

Particularly good results can be achieved with the measurement circuit 10 of FIG. 1, if at least some, and preferably, all strain gauges have a "counterpart." A counterpart to a first strain gauge refers preferably to a second strain gauge, which is connected to an opposite input voltage approximately equal to the first strain gauge. This can be used in particular to keep thermal drift low: resistance changes in a first strain gauge due to temperature changes are compensated for by corresponding resistance changes in a second strain gauge.

The wire lengths of two strain gauges wired as counterparts are to be selected preferably approximately equal so that temperature changes do not cause any offset of the output voltage. The role of the counterpart is not rigidly prescribed, and given sequential measurement, it can be respectively redistributed among the strain gauges involved by changing the polarity of the input voltages. In the embodiment of FIG. 1, for example in a first measurement, R1 can be the counterpart of R2, and R3 can be the counterpart of R4. In a second measurement, by changing the input voltages, R1 can assume the role of counterpart of R3, and R2 can assume the role of counterpart of R4.

As a variant of the embodiment of FIG. 1, one could also use a fixed resistor as a counterpart of a strain gauge. However, it is preferably taken into account that, as a function of the temperature, fixed resistors may change their resistance differently, in particular much differently, than strain gauges, whose apparent elongation one can calibrate to a material (in other words, the material of the component on which the strain gauge is attached). From an overall perspective, a larger drift is to be expected using a fixed resistor as a counterpart for a strain gauge.

By means of the individually adjustable input voltages, the strain gauges can generally be weighted individually. As a variant to an identical (but opposite) weighting of a strain gauge and its counterpart, it would be possible to select an uneven weighting by means of variously dimensioned input voltages. This can be used to achieve certain effects, e.g., to take into account non-symmetrical geometries of a component. If for example a change in length of a tube, which comprises different wall thicknesses in the peripheral direction, is to be measured by an arrangement according to FIG. 1, it may be useful to weight a first strain gauge, which is attached to a first pipe section having a first wall thickness, differently by means of a suitable input voltage than a second strain gauge, which is attached to a second pipe section having a second wall thickness (that differs from the first wall thickness). However, the weightings are preferably similar here also, for example having a maximum deviation of 3 percent, 5 percent or 10 percent, to limit thermal drift to an acceptable degree.

Figure 2:
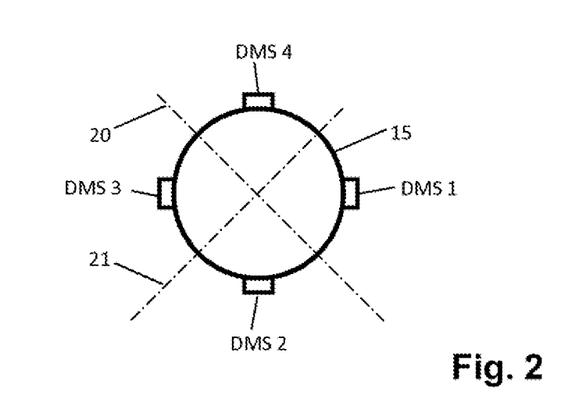
FIG. 2 depicts an arrangement of resistors on a component according to an embodiment of the present disclosure.

FIG. 2 depicts an arrangement of resistances (strain gauges) on a component according to an embodiment of the present invention. On a round rod (or pipe) 15, whose cross-section is indicated, four strain gauges (strain gauge 1 to strain gauge 4) are attached in an evenly distributed manner on the circumference of the rod. In this example, the strain gauges are attached in a longitudinal direction to a surface of the rod. The strain gauges are thereby preferably connected in a planar manner to the surface of the rod, for example adhesively bonded to the rod. A change in length of the rod section on which a strain gauge is attached causes a change in length of the corresponding strain gauge and thus a change in the resistance value of the strain gauge, which can be evaluated according to FIG. 1.

Dashed lines in FIG. 2 also indicate two axes 20, 21, about which the rod 15 can bend. If one connects strain gauges 1 and 4 having a positive weighting and strain gauges 2 and 3 having a negative weighting, one measures the bending moment about the axis 20. In contrast, one measures the bending moment and the axis 21 when one weights strain gauges 3 and 4 positively and strain gauges 1 and 2 negatively. This change in weighting can occur by simply changing the sign of the input voltages applied to the respective strain gauge.

In one variant (not depicted), one could attach the strain gauges similarly as in FIG. 2, yet alternatingly diagonally at an angle of 45 degrees to approx. 80 degrees to the longitudinal axis of the rod. In this way, given corresponding input voltages, one can measure not only the bending about the axes 20 and 21, but also the torsion about the longitudinal axis of the rod. By means of an angle greater than 45 degrees, one can decrease the modulation of the measurement amplifier during the torsion measurement in relation to the modulation during the bending measurement. However, alternatively one could also vary the magnitude of the input voltages depending on the measurement variable.

In principle, one can select angles between 0 degrees and 90 degrees. Reasonable angle values can be determined empirically for every application. In many cases, the angles will be between 10 degrees and 80 degrees, or between 30 degrees and 60 degrees or between 40 degrees and 50 degrees. For example, the angle can essentially be 45 degrees.

For the signs of the input voltages, the following table could be used:

|  | DMS 1 | DMS 2 | DMS 3 | DMS 4 |
| --- | --- | --- | --- | --- |
| Bending about axis 20 | + | − | − | + |
| Bending about axis 21 | − | − | + | + |
| Torsion | − | + | − | + |

When successively switching over the input voltages U1 to U4, one would obtain at the output 4 of the amplifier 1 sequential electrical voltages proportional to the desired measured variables.

Figure 3:
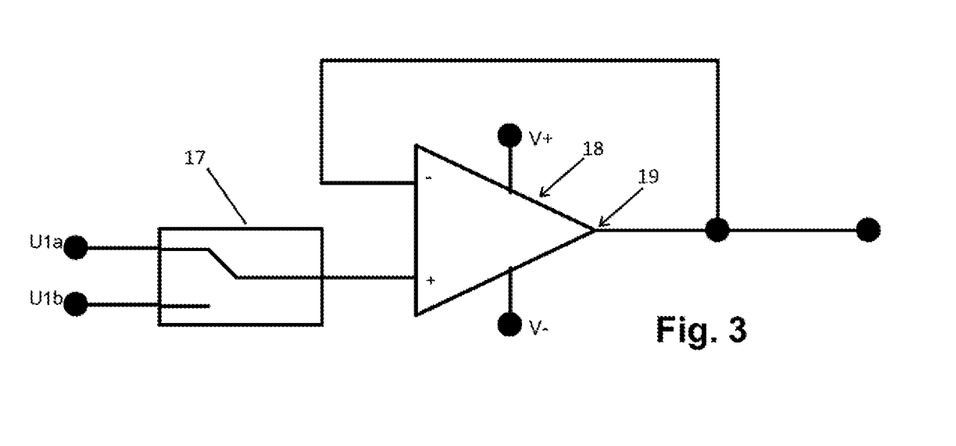
FIG. 3 depicts a circuit for use with embodiments of the present disclosure.

Depending on the components used, bilateral CMOS switches can be used for example for switching over the input voltages. Preferably these are used with downstream impedance converters. An example of such an impedance converter is shown in FIG. 3, wherein the CMOS switch is indicated with reference sign 17. Two different input voltages U1a and U1b are applied at the inputs of the CMOS switch. An output of the CMOS switch is coupled to a non-inverting input of an operational amplifier 18 (this operational amplifier 18 is not to be confused with the operational amplifier 1 from FIG. 1). An output 19 of the operational amplifier 18 is fed back in a manner known per se to the inverting input of the operational amplifier 18. In addition, the output 19 is used as input voltage U1 for the strain gauge 1 (or R1) of FIG. 1.

The switchover indicated in FIG. 3 can be undertaken for example at a frequency of several tens of kilohertz, which is sufficient in many cases for the quasi-simultaneous measurement of mechanical variables.

Separating the measurement variables at the output 4 (FIG. 1) can occur by an AD conversion of the output voltage U_out of the measurement amplifier, possibly after a certain setting time in each case after switching over the input voltages of the strain gauge. The CMOS switches, the AD converter and a digital output interface (not depicted) as well as processing the measurement data in physical units can be controlled by means of a microcontroller (not depicted) integrated in the sensor. Generally, the user would not notice the quick switchover of the input voltages of the strain gauge in real-life measurement operations. In other words, the user would typically have the impression that the different measurements (bending about different axes, torsion and so on) occur essentially concurrently and are being outputted/indicated simultaneously.

Figure 4:
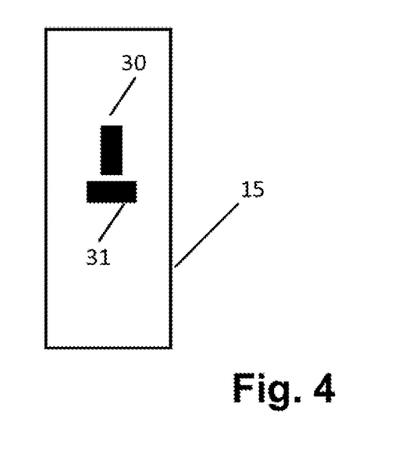
FIG. 4 depicts an arrangement of resistors on a component according to an embodiment of the present disclosure.

FIG. 4 depicts another example based on the example from FIG. 2. A section of the surface of the rod 15 is represented as an area, on which two strain gauges 30, 31 are arranged perpendicular to each other. Strain gauge 30 is arranged along the longitudinal direction of the rod 15 ("linearly"). Strain gauge 31 is arranged transversely to the longitudinal direction of the rod 15.

The arrangement of FIG. 4 can be used for measuring the bending moments and the tension/compression force on the round rod 15. It is thereby reasonable to use three or four of such groups, which are arranged in a distributed manner at 120 degrees or 90 degrees on the circumference of the rod. To measure tension/compression or bending in a linear/transverse manner at various planes, the signs (input voltage) can be selected as follows for weighting the strain gauges, for example:

| Measuring tension/compression using 6 strain gauges | Strain gauge linear | Strain gauge transverse |
| --- | --- | --- |
| 0° | + | − |
| 120° | + | − |
| 240° | + | − |

| Measuring tension/compression using 8 strain gauges | Strain gauge linear | Strain gauge transverse |
| --- | --- | --- |
| 0° | + | − |
| 90° | + | − |
| 180° | + | − |
| 270° | + | − |

| Bending 6 strain gauges | Strain gauge linear/transverse Plane I | Strain gauge linear/transverse Plane II | Strain gauge linear/transverse Plane III |
| --- | --- | --- | --- |
| 0° | +/− | −/+ | −/+ |
| 120° | −/+ | +/− | −/+ |
| 240° | −/+ | −/+ | +/− |

| Bending 8 strain gauges | Strain gauge linear/transverse Plane I | Strain gauge linear/transverse Plane II |
| --- | --- | --- |
| 0° | +/− | −/+ |
| 90° | +/− | +/− |
| 180° | −/+ | +/− |
| 270° | −/+ | −/+ |

Figure 5:
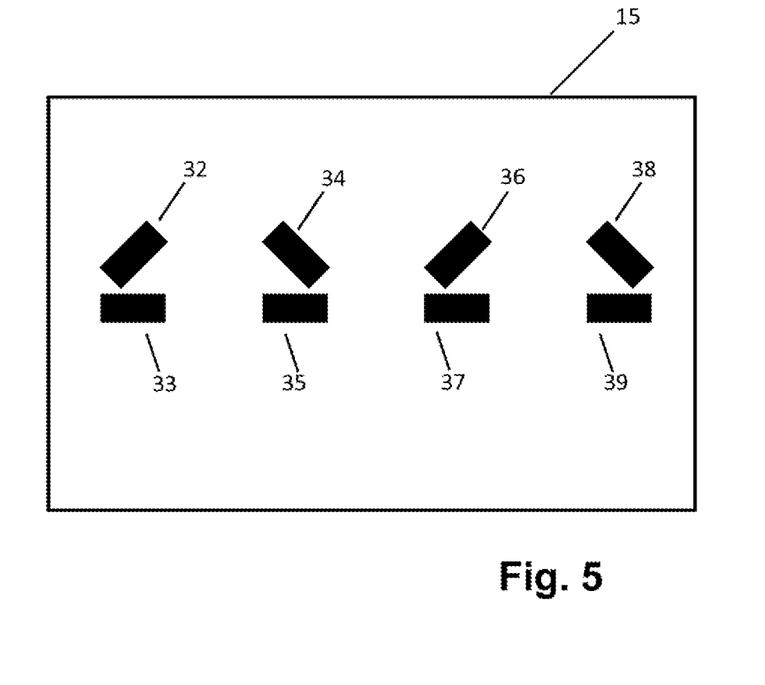
FIG. 5 depicts an arrangement of resistors on a component according to an embodiment of the present disclosure.

An additional variant is represented in FIG. 5. FIG. 5 depicts the surface (or a section of the surface) of the rod 15, on which the four pairs of strain gauges are arranged. Each pair comprises in each case one strain gauge 33, 35, 37, 39 transverse to the longitudinal direction of the rod 15 and in each case one strain gauge 32, 34, 36, 38, which is inclined by an angle between 0 degrees and 90 degrees relative to the longitudinal direction of the rod 15, for example approx. 45 degrees (see also the variant of FIG. 2 regarding the possible angles). The inclined strain gauges are thereby alternatingly inclined in one direction or the other, in other words strain gauge 32 and 36 to the right and strain gauge 34 and 38 to the left.

With such an arrangement, the bending moments can measure in two planes the tension force/compression force as well as the torsional moment, which acts on the rod 15. The weighting of the strain gauges can thereby be selected as follows:

| Bending | Strain gauge inclined/transverse (Plane I) | Strain gauge inclined/transverse (Plane II) |
|---|---|---|
| 0° | +/− | −/+ |
| 90° | +/− | +/− |
| 180° | −/+ | +/− |
| 270° | −/+ | −/+ |

| Torsion | Strain gauge inclined/transverse |
|---|---|
| 0° | +/0 |
| 90° | −/0 |
| 180° | +/0 |
| 270° | −/0 |

| Tension/compression | Strain gauge inclined/transverse |
|---|---|
| 0° | +/− |
| 90° | +/− |
| 180° | +/− |
| 270° | +/− |

The evaluation of measurement results will now be examined in greater detail using a circuit according to FIG. 1. For example, as already mentioned, the following applies for the four input resistors R1 to R4:

$$U\_out = -U1(R0/R1) - U2(R0/R2) - U3(R0/R3) - U4(R0/R4)$$

If one wishes to use R3 for example as a counterpart to R1, and R4 as a counterpart to R2, and if the input voltages continue to be the same magnitude but the counterparts have the opposite polarity, one could write:

$$U1 = U2 = U\_in \text{ and } U3 = U4 = -U\_in$$

In addition, we are seeing a situation in which all resistors have the same resistance R in the basic state (thus without elongation). In this case, it holds that:

$$Ri = R + \Delta Ri (i = 1 \ldots 4)$$

wherein, $\Delta Ri$ is the change in the resistance value of the resistor Ri caused by the elongation.

From this, one obtains $$U\_out/U\_in = -R0/(R+\Delta R1) - R0/(R+\Delta R2) + R0/(R+\Delta R3) + R0/(R+\Delta R4).$$

If one selects R0=R for the counter-coupling resistance shown in FIG. 1, one can say approximately:

$$U\_out/U\_in = +\Delta R1/R + \Delta R2/R - \Delta R3/R - \Delta R4/R$$

It shall thereby be noted that, in regard to an exact calculation, the deviation caused by the approximation amounts to only approx. 0.0008 percent for strain gauges having 350 ohms and a detuning of 1 ohm caused by the elongation. This deviation is generally significantly smaller than the expected measurement accuracy.

By selecting R0, the total amplification can be selected. If, instead of R0=R, one selects R0=35 kiloohms for example for the counter-coupling resistance and R=350 ohms as the resistance value of the strain gauge, the result would be an amplification by a factor of 100.

Instead of (periodically) constant input voltages and ohmic input resistances, one can also connect alternating current voltages as input voltages to e.g., inductive or capacitive input resistances. In regard to an inductive resistor, a mechanical change would typically influence the inductive resistor in such a manner that a ferromagnetic core pushes itself into a coil of the inductive resistor or is at least partially pulled out of it, which results in a change of its resistance value. In regard to a capacitive resistor, a change in its resistance value would typically be caused by the fact that due to mechanical changes the distance between two plates of a condenser of the capacitive resistor changes.

Using inductive or capacitive input resistances may result in a trade-off between the alternating current voltage frequency and the switchover frequency of the weightings of the input voltages. In addition, if the sign of the weightings changes, the phase shifts require a certain amount of time, since inductive or capacitive measurement resistors tend to fluctuate more than ohmic strain gauge resistors, which one can switch over within a few microseconds in the context of possible increase rates of the impedance converter, for example.

In regard to the circuit according to FIG. 1, another advantage of the circuit comes into play. Specifically, it is possible in a test mode (in other words generally without mechanically changing the strain gauges) to energize individual strain gauges (for example, only one strain gauge) by applying an input voltage that differs from ground (0V) and to de-energize all others (0V). By measuring the voltage U_out actually applied at output 4 of the operational amplifier 1 and comparing it to the expected output voltage, one can determine whether the energized input resistance is operationally or correctly connected. If there is a deviation outside of a tolerance that is or is to be established, one can conclude that the energized input resistance is not operational or not correctly connected. This test can be performed successively for other resistors of the circuit. In this way, the integrity of the measuring arrangement can be verified. Because the input resistances can be quickly energized and de-energized if necessary, this test can be performed in a relatively short time. This is advantageous in particular for a large number of connected strain gauges.

Developments of the circuit presented in FIG. 1 shall now be described by means of FIGS. 6 to 10.

The single-stage circuit of FIG. 1 represents a basic circuit, which does not suppress the common mode voltages at the inputs (e.g., network humming). To enable common mode suppression, a two-stage circuit according to FIG. 6 can be used. In turn, this circuit comprises in a first (amplification) stage an operational amplifier 1 comprising a counter-coupling resistor R0a and input resistances. In the depicted example, only two input resistors R1 and R2 are connected to the inverting input of the operational amplifier 1 and corresponding input voltages U1 and U2. However, the circuit can also comprise additional input resistances. Correspondingly, the circuit comprises a second operational amplifier 100, to which in turn a counter-coupling resistor R0a and input resistors R3 and R4 are connected. The second operational amplifier 100 is also part of the first (amplification) stage.

Figure 6:
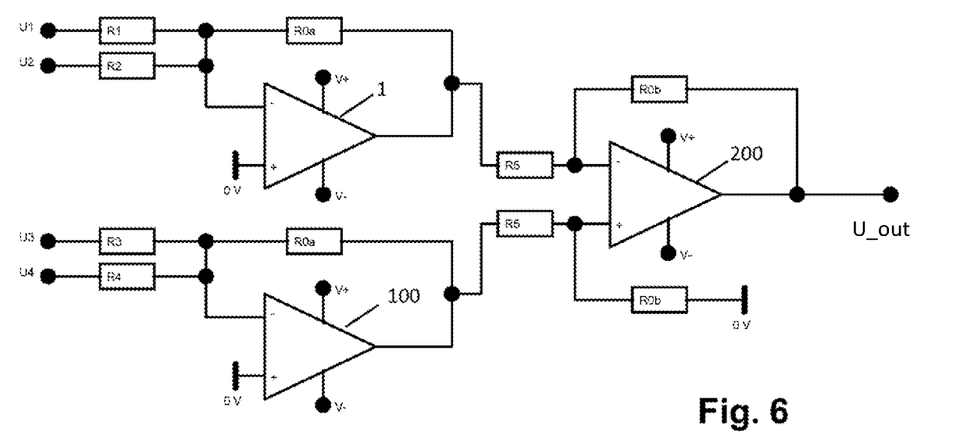
FIG. 6 depicts a circuit according to an embodiment of the present disclosure.

The outputs of the operational amplifiers 1 and 100 are in each case connected via resistors R5 to the inverting or the non-inverting input of a third operational amplifier 200, which represents a second (amplification) stage. Its output is connected via an additional counter-coupling resistor R0b to the inverting input of the third operational amplifier 200. The non-inverting input of the third operational amplifier 200 is connected via an additional resistor R0b to ground (0V). The output voltage U_out can be picked off at the output of the third operational amplifier 200.

In the circuit of FIG. 6, two input amplifiers 1, 100 are thus used for two strain gauge groups. The difference between the output signals is then calculated and amplified.

Instead of the differential amplifier 200 depicted in FIG. 6, the second-stage amplification can also be achieved by an instrument amplifier that can be obtained fully integrated, whose amplification is established with only one single external resistor.

Figure 7:
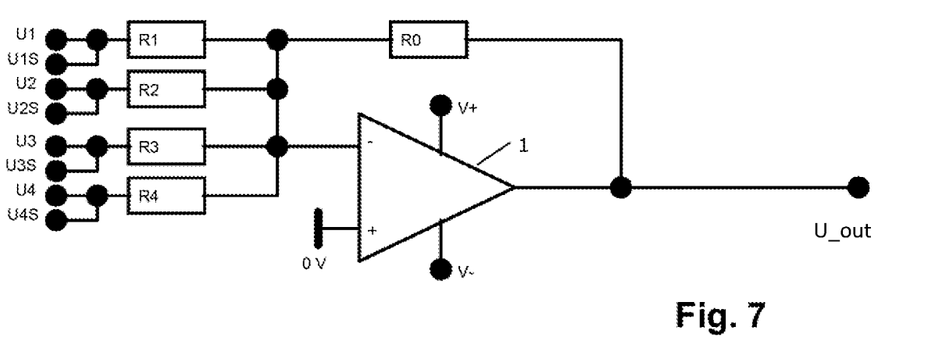
FIG. 7 depicts a circuit according to an embodiment of the present disclosure.

FIG. 7 depicts a variant of the circuit from FIG. 1. The input voltages U1 to U4 are fed back via sensor lines and can then be measured as feedback voltages U1S to U4S. Such a circuit can be used in particular for relatively long cables between the voltage source/voltage sources, which provides/provide the input voltages U1 to U4, and the input resistors R1 to R4. Similarly, this circuit is also used when increased requirements are placed on the measurement accuracy. In this circuit, it is assumed that the voltage losses in the cable from an input voltage source (Ui) to the corresponding input resistor (Ri) are approximately as large as the voltage losses in the corresponding feedback sensor line. Accordingly, the average value between the (applied) input voltage Ui and the feedback sensor voltage UiS can be assumed to be the actual voltage applied at the (in the drawing, left) input 6 of an input resistor Ri. The measurement value display of the measurement amplifier can be corrected correspondingly.

Figure 8:
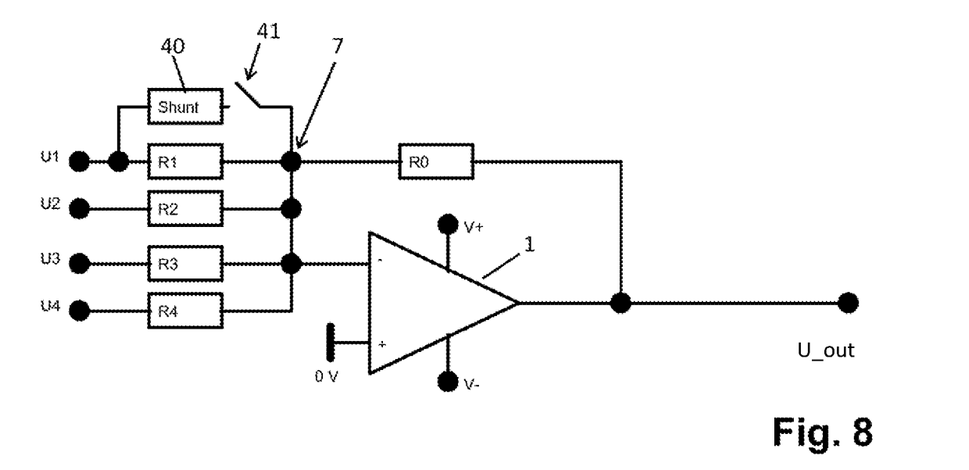
FIG. 8 depicts a circuit according to an embodiment of the present disclosure.

FIG. 8 depicts an additional circuit variant based on the circuit of FIG. 1. In FIG. 8, a shunt resistor 40 is also used, which can be connected in parallel to a strain gauge (here R1) via a switch 41. When the switch 41 is closed, there is a defined detuning of the measuring circuit, i.e., when the shunt resistor 40 is switched on, the output voltage U_out jumps up. Using the (measured) value of this jump and the (prior known) resistance value of the shunt resistor 40, one can calibrate the measurement amplifier or check the circuit for proper functioning.

Figure 9:
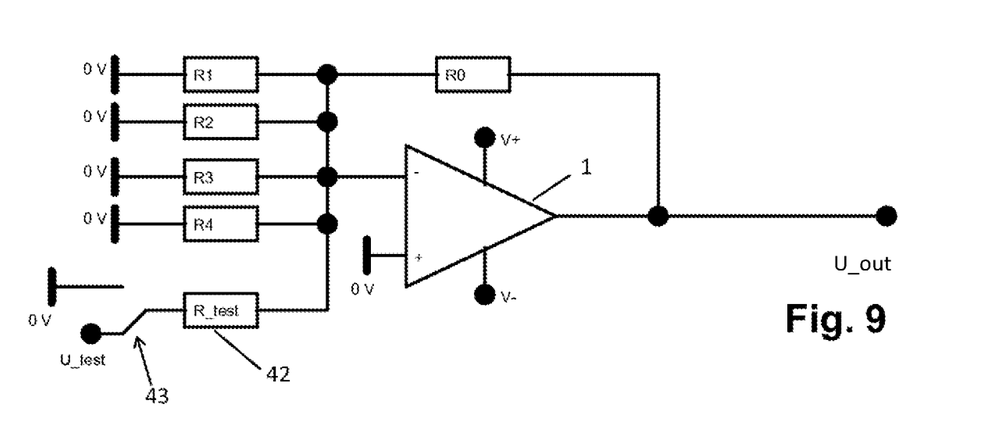
FIG. 9 depicts a circuit according to an embodiment of the present disclosure.
Figure 10:
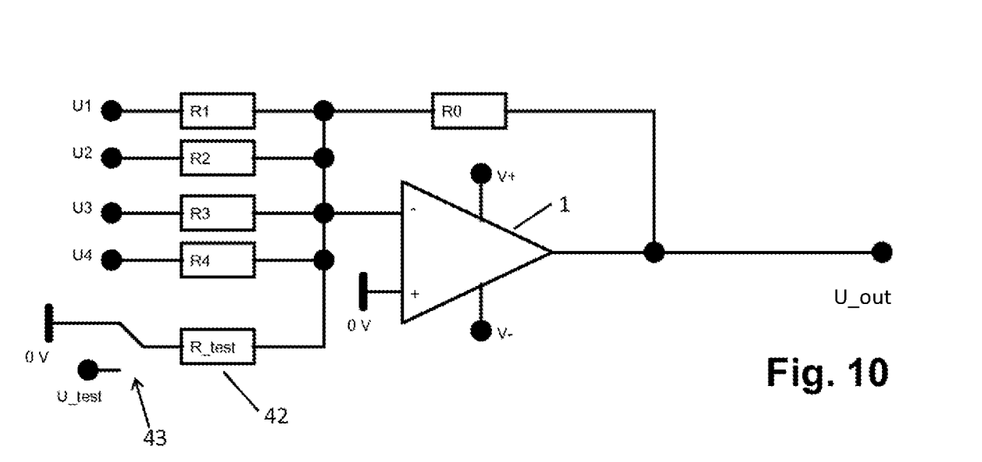
FIG. 10 depicts a circuit according to an embodiment of the present disclosure.

FIGS. 9 and 10 depict an additional circuit variant based on the circuit of FIG. 1. In FIGS. 9 and 10, there is also a test resistor 42 (R_test). It may be supplied with an input voltage via a switch 43. The switch 43 connects the test resistor 42 either to a test voltage U_test (FIG. 9) or to ground (0V, FIG. 10). The test resistor 42 is also connected to the node 7 and thus also to the inverting input of the operational amplifier 1.

In a test mode, which is depicted in FIG. 9, (only) the test resistor 42 is connected to an input voltage that is different from ground. All other input resistors R1 to R4 have their inputs connected to ground. In this test mode, one can verify in particular the correct functioning of the operational amplifier 1.

To use the circuit for normal measuring mode, the input of the test resistor 42 is connected to ground by the switch 43, as shown in FIG. 10. The other input resistors R1 to R4 can then be connected to their corresponding input voltages that differ from ground. The test resistor then does not influence the measurement substantially so that the circuit behaves as it does in FIG. 1.

Figure 11:
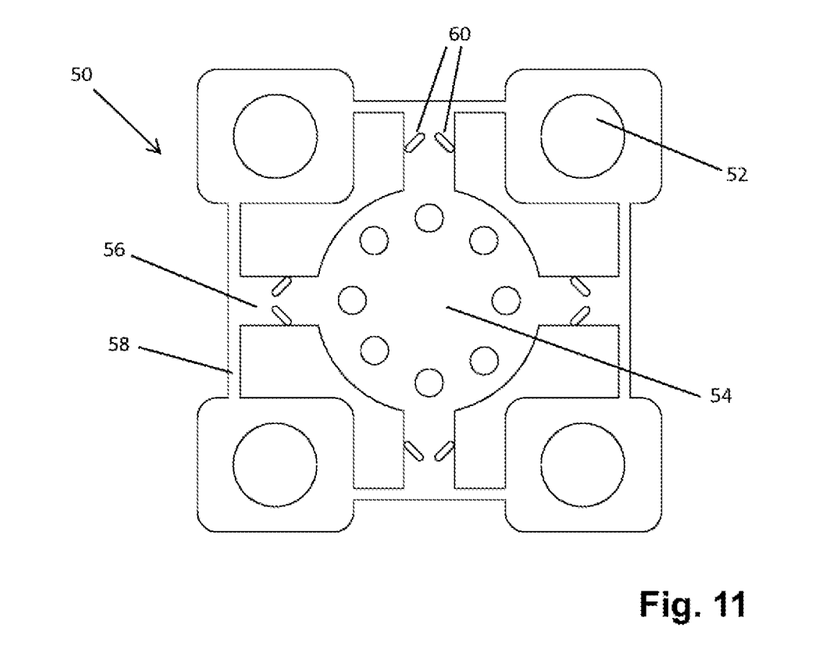
FIG. 11 depicts an arrangement of resistors on a component according to an embodiment of the present disclosure.

FIG. 11 depicts an application example of the present invention. The 6D force-torque sensor 50 has a center tool hub 54, which is connected to four measuring spokes 56. At their outer ends, the measuring spokes 56 are each connected to a central region of a leaf spring 58. The sensor also comprises four casing screw-on points 52. The four leaf springs 58 extend between the casing screw-on points 52. Multiple strain gauges 60 are arranged on each measuring spoke 56. In the depicted example, there are on the visible side of the arrangement in each case two strain gauges 60 on each measuring spoke 56, wherein each strain gauge 60 is inclined by approx. 45 degrees to a center line of the measuring spoke 56. On each measuring spoke 56, one strain gauge 60 is inclined to the right and one strain gauge 60 is inclined to the left. Therefore, all in all, eight strain gauges 60 are arranged on the visible side of the arrangement. In addition, there are on the non-visible side facing away from the observer an additional eight strain gauges 60 in a corresponding or similar arrangement, and thus sixteen strain gauges 60 in all.

The strain gauge 60 of two respective adjoining measuring spokes each form one single 6D sensor. Two redundant 6D sensors are thereby created.

With the arrangement shown in FIG. 11, the strain gauges 60 can measure forces and/or torques in the measuring spokes when the central tool hub 54 moves with respect to the casing screw-on points 52. The measurements can be evaluated by the previously described circuits.

With the sensor 50, one can in each case measure the bending moments in two planes, the torsional moment as well as the forces in three coordinate directions.

Figure 12:
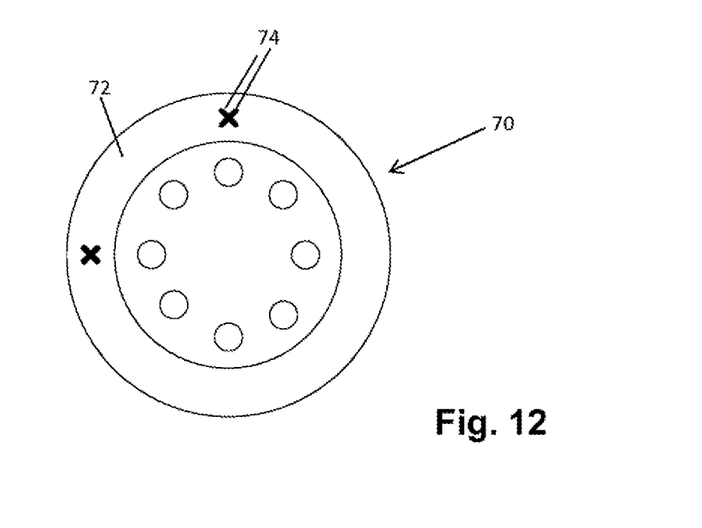
FIG. 12 depicts an arrangement of resistors on a component according to an embodiment of the present disclosure.

FIG. 12 depicts an additional application example of the present invention. FIG. 12 depicts in a simplified representation a harmonic drive gear 70 or a part thereof. Directly on the flex spline 72 of the gear 70, there are attached four strain gauges 74 in two strain gauge groups, which can be used for torque measurement. Within a group, the two strain gauges 74 are rotated by 90 degrees to each other. In the present example, the strain gauges 74 of one group are arranged in a cross pattern. The two groups are offset by 90 degrees to each other in the circumferential direction of the flex spline 72. Two strain gauges 74 (one from each group) are thus identically oriented in the circumferential direction. These are perpendicular in the circumferential direction to the two other strain gauges 74.

Two strain gauges 74, each, identically oriented in the circumferential direction, can be evaluated by corresponding input voltages having signs opposite to the two other strain gauges positioned perpendicular to these in each case. However, due to the complex deformation of the flex splines, interfering harmonics can thereby be created with the doubled and quadrupled rotational frequency of the wave generator of the harmonic drive gear. To compensate for these interfering harmonics, the strain gauges 74 can be variably weighted in a fixed chronological sequence. The degree of the compensation can thereby be adjusted by the temporal duration of the weighting and/or by the magnitude of the amount of the weighting. For example:

| Strain gauge 1 | Strain gauge 2 | Strain gauge 3 | Strain gauge 4 | Measurement | Temporal portion |
|---|---|---|---|---|---|
| +1 | −1 | +1 | −1 | Torsion | Fixed, long |
| +1 or −1 | +1 or −1 (as for strain gauge 1) | 0 | 0 | Compensation strain gauge 1/2 | Adjustable, short |

-continued

| Strain gauge 1 | Strain gauge 2 | Strain gauge 3 | Strain gauge 4 | Measurement | Temporal portion |
|---|---|---|---|---|---|
| 0 | 0 | +1 or −1 | +1 or −1 (as for strain gauge 3) | Compensation strain gauge 3/4 | Adjustable, short |

By means of the weighting using the opposite sign of the strain gauges 1 and 2 as well as strain gauges 3 and 4 (first line in table), measurement signals are created, which are proportional for a fixed period primarily to the applied torque.

By means of the weighting using the same sign of the strain gauges 1 and 2, or 3 and 4 (second and third lines in table), measurement signals are created, which are proportional for an adjustable short period primarily to the interference components.

By selecting the temporal duration of the two compensation portions, the interference harmonics can be largely removed or significantly decreased in the average value of the overall signal curve with respect to time.

Besides this compensation by means of an average value calculation, compensation can be calculated after digitizing the measured usable and interfering parts.

Preferably, the switchover thereby occurs rapidly in relation to the desired bandwidth of the useful signal and the motor rotational frequency, e.g., in a range of several kilohertz. For this method, it is also recommended to use strain gauges that have been compensated for apparent elongation and matched to the material of the flex spline.

Even though illustrative designs were explained in the preceding description, it is pointed out that a plurality of modifications are possible. It is also pointed out that the illustrative embodiments are only examples that shall in no way limit the scope of protection, the applications and the construction. Instead, the preceding description provides a person skilled in the art with guidelines for implementing at least one illustrative embodiment, wherein various modifications, particularly in regard to the function and arrangement of the described components can be undertaken without departing from the scope of protection as it emerges from the claims and feature combinations equivalent to these.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 Operational amplifier
2 Inverting input of the operational amplifier
3 Non-inverting input of the operational amplifier
4 Output of the operational amplifier
5 First electrical connection of an input resistance
6 Second electrical connection of an input resistance
7 Node
10 Measuring circuit
15 Rod/pipe/component
17 CMOS switch
18 Operational amplifier of an impedance converter
19 Output of the operational amplifier of the impedance converter
20, 21 First and second axis (bending)
30-39 Strain gauges
Shunt resistor
Switch
Test resistor
Switch
Sensor
Casing screw-on points
Tool hub
Measuring spoke
Leaf spring
Strain gauge
Harmonic drive gear
Flex spline
Strain gauge
100 Operational amplifier (first stage)
200 Operational amplifier (second stage)

What is claimed is:

1. A device for measuring mechanical changes in a structure, comprising:
   a plurality of resistors each configured for converting a mechanical change of the structure into a change of a resistance value of the respective resistor; and
   at least one operational amplifier;
   wherein the plurality of resistors and the at least one operational amplifier are connected in such a manner that each resistor serves as input resistance for the operational amplifier, and the operational amplifier is configured to supply a measurement result at an output of the operational amplifier;
   wherein:
      a first electrical connection of each resistor is electrically coupled to an input of the operational amplifier, and
      a second electrical connection of each resistor is configured for electrically coupling with a respective electrical input voltage; and
   wherein the device is configured to measure various types mechanical changes of the structure based on changes in the input voltages for the respective resistors.

2. The device of claim 1, wherein at least one of the plurality of resistors is a strain gauge, an inductive resistor, or a capacitive resistor.

3. The device of claim 1, wherein at least one of the plurality of resistors is configured to be attached to the structure such that a mechanical change of the structure causes a change of the resistance value of the at least one resistor.

4. The device of claim 3, wherein the mechanical change of the structure comprises at least one of:
   a change of a magnitude in at least one dimension of the structure,
   a change of a magnitude in bending of the structure, or
   a change of a magnitude in torsion of the structure; and
   wherein, in the case of torsion, the torsion comprises a torsion about an axis, wherein at least one section of at least one of the plurality of resistors responds to a mechanical change of the at least one section in a first direction by changing the resistance value;

wherein the at least one resistor is attached to the structure in such a manner that the first direction forms an angle with a line parallel to the torsion axis and the angle is between zero and 90 degrees.

5. The device of claim 4, wherein, in the case of torsion, the angle is one of:
greater than or equal to 10 degrees, and less than 90 degrees;
greater than or equal to 30 degrees, and less than 90 degrees;
greater than or equal to 40 degrees, and less than 90 degrees;
greater than zero degrees, and less than or equal to 50 degrees;
greater than zero degrees, and less than or equal to 60 degrees; or greater than zero degrees, and less than or equal to 80 degrees.

6. The device of claim 1, wherein the device is configured to infer the actual voltage applied to a respective one of the plurality of resistors based on the value of the applied input voltage and the value of a feedback voltage that is fed back for the at least one resistor.

7. The device of claim 1, further comprising a digital/analog converter configured to provide the respective input voltage for at least one of the plurality of resistors.

8. The device of claim 1, further comprising a shunt resistor connected in parallel to at least one of the plurality of resistors.

9. The device of claim 1, wherein the plurality of resistors comprises at least two resistors connected to each other in parallel and serving as input resistances for the operational amplifier.

10. The device of claim 9, wherein the device is configured to be operated in a measuring mode such that, when in the measuring mode, input voltages are applied in a pair-wise manner at each pair of two resistors, wherein the pair-wise applied input voltages have substantially the same magnitude but an opposite polarity.

11. The device of claim 9, wherein the device is configured to be operated in a first test mode such that, when in the first test mode, an input voltage that differs from ground is applied to only one of the resistors and the input voltage is connected to ground at all other resistors.

12. The device of claim 11, further comprising:
an additional test resistor connected in parallel to the at least one resistor;
wherein the device is configured to be operated in a second test mode such that, when in the second test mode, an input voltage different from ground is applied only to the test resistor and the input voltage is connected to ground at all other resistors; and
when the device is in a measuring mode, the input voltage for the test resistor is connected to ground.

13. The device of claim 1, wherein:
the plurality of resistors comprises at least two resistors;
in a first stage, the at least one operational amplifier comprises two operational amplifiers;
at least one of the at least two resistors serves as an input resistance for the two operational amplifiers; and
outputs of the two operational amplifiers of the first stage are electrically coupled in each case to inputs of a third operational amplifier;
wherein the third operational amplifier is configured to deliver a measurement result to an output.

14. An arrangement for measuring mechanical changes, comprising:
a component; and
a device according to claim 1;
wherein at least one of the plurality of resistors of the device is attached to the component.

15. The arrangement of claim 14, wherein:
the component comprises a 6-D force-torque sensor having multiple measuring spokes; and
each measuring spoke is provided with multiple resistors of the measuring device.

16. The arrangement of claim 14, wherein the component comprises a flex spline of a harmonic drive gear.

17. A method for measuring mechanical changes in a structure, comprising:
obtaining an arrangement according to claim 14;
supplying at least one of the plurality of resistors with an input voltage; and
obtaining the measurement result supplied at the output of the operational amplifier in response to the input voltage.

* * * * *